US012291056B1

(12) United States Patent
Goodman

(10) Patent No.: US 12,291,056 B1
(45) Date of Patent: May 6, 2025

(54) PAINT ROLLER CLEANING

(71) Applicant: Painting Productline Innovations, Denver, CO (US)

(72) Inventor: Marty Goodman, Boulder, CO (US)

(73) Assignee: Pinnacle Pro Inc, Lafayette, CO (US)

( * ) Notice: Subject to any disclaimer, the term of this patent is extended or adjusted under 35 U.S.C. 154(b) by 0 days.

(21) Appl. No.: 18/780,886

(22) Filed: Jul. 23, 2024

(51) Int. Cl.
*B44D 3/00* (2006.01)
*B05C 17/02* (2006.01)
*B08B 3/02* (2006.01)
*B44D 3/02* (2006.01)

(52) U.S. Cl.
CPC .......... *B44D 3/006* (2013.01); *B05C 17/0245* (2013.01); *B08B 3/02* (2013.01); *B44D 3/02* (2013.01)

(58) Field of Classification Search
None
See application file for complete search history.

(56) References Cited

U.S. PATENT DOCUMENTS 3,103,690 A * 9/1963 Day ........................ B05C 17/03 401/206
3,428,060 A * 2/1969 Spivey .................. B44D 3/006 134/900
6,818,071 B2 * 11/2004 King ...................... B44D 3/006 68/213
9,834,034 B2 * 12/2017 Egan ...................... B44D 3/006
2013/0152980 A1 * 6/2013 Hues ...................... A46B 17/06 134/198

* cited by examiner

*Primary Examiner* — Rita P Adhlakha
(74) *Attorney, Agent, or Firm* — MP Patents, LLC

(57) ABSTRACT

A paint roller cover cleaning system includes a tubular enclosure having a slot and a rib. The tubular enclosure is configured to house a paint roller cover and is defined by an exterior surface surrounding an interior surface surrounding a lumen having a center and a length extending from an open first end to an open second end. In communication with the lumen, the slot is formed through the exterior and interior surfaces of the tubular enclosure and has a sidewall projecting outward from the exterior surface of the tubular enclosure as well as into the lumen and forms the rib within the lumen. The slot and the rib are configured to cooperate to direct a fluid stream into the lumen along a path tangent to a circle having a diameter less than a width of the lumen.

12 Claims, 9 Drawing Sheets

PAINT ROLLER CLEANING

SUMMARY

The disclosure describes a paint roller cover cleaning system. The system includes, configured to house a paint roller cover, a tubular enclosure defined by an exterior surface surrounding an interior surface surrounding a lumen. The lumen has a center and a length extending from an open first end to an open second end. In communication with the lumen, a slot is formed through the exterior and interior surfaces of the tubular enclosure and has a sidewall projecting outward from the exterior surface of the tubular enclosure as well as into the lumen and forms a rib within the lumen. The slot and the rib are configured to cooperate to direct a fluid stream into the lumen along a path tangent to a circle having a diameter less than a width of the lumen.

The disclosure also describes a second paint roller cover cleaning system. The second system includes, configured to house a paint roller cover, a tubular enclosure defined by an exterior surface surrounding an interior surface surrounding a lumen having a center and a length extending from an open first end to an open second end. In communication with the lumen, a slot is formed through the exterior and interior surfaces of the tubular enclosure and has a first elongate sidewall having a first height and a second elongate sidewall having a second height less than the first height wherein the second sidewall projects into the lumen to form a rib within the lumen. The slot and the rib are configured to cooperate to direct a fluid stream into the lumen so that the fluid stream rotates a roller cover provided to the tubular enclosure lumen.

Further, the disclosure describes a third paint roller cover cleaning system. The third system includes a tubular enclosure, a cap, a base, a first rotor and a second rotor. Configured to house a paint roller cover, the tubular enclosure is defined by an exterior surface surrounding an interior surface surrounding a lumen having a center and a length extending from an open first end to an open second end. In communication with the lumen, a slot is formed through the exterior and interior surfaces of the tubular enclosure and has a sidewall projecting outward from the exterior surface of the tubular enclosure as well as into the lumen and forms a rib within the lumen. The cap is configured to surround and close the open first end of the tubular enclosure. The first rotor has a length extending from a first end plate to a second end plate and is configured for rotatable coupling with the cap through a first axle and for insertion into a lumen of a paint roller cover from a first end. The base includes one or more drain holes and a bottom rim and is configured to support the tubular enclosure while surrounding the second open end. The second rotor has a length extending from a first end plate to a second end plate and is configured for rotatable coupling with the base through a second axle and insertion into a lumen of a paint roller cover from a second end. The slot and the rib are configured to cooperate to direct a fluid stream into the lumen along a path forming a non-zero angle with a longitudinal plane passing through the lumen center.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those of ordinary skill the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they may be implemented. Although the best mode of carrying out the present disclosure has been set forth herein, those of ordinary skill in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the disclosure provide a system for efficient cleaning of painting roller covers and similar applicators with decreased clean up after the process.

Previously, if roller covers and other painting applicators were not discarded after a use or two, they have been cleaned and stored for future use in a time-consuming and messy process, for example, by rinsing at a spigot in the open air.

Embodiments of the disclosure substantially eliminate, or at least partially address, problems in the prior art, enabling users to wash or otherwise clean a variety of sizes of painter roller covers or other applicators while directing any used washing and/or cleaning fluids away from the cleaning process for easy collection.

Additional aspects, advantages, features and objects of the disclosure will be made apparent from the drawings and the detailed description of the illustrative embodiments construed in conjunction with the appended claims that follow.

It will be appreciated that features of the disclosure are susceptible to being combined in various combinations without departing from the scope of the disclosure as defined by the appended claims.

Figure 1:
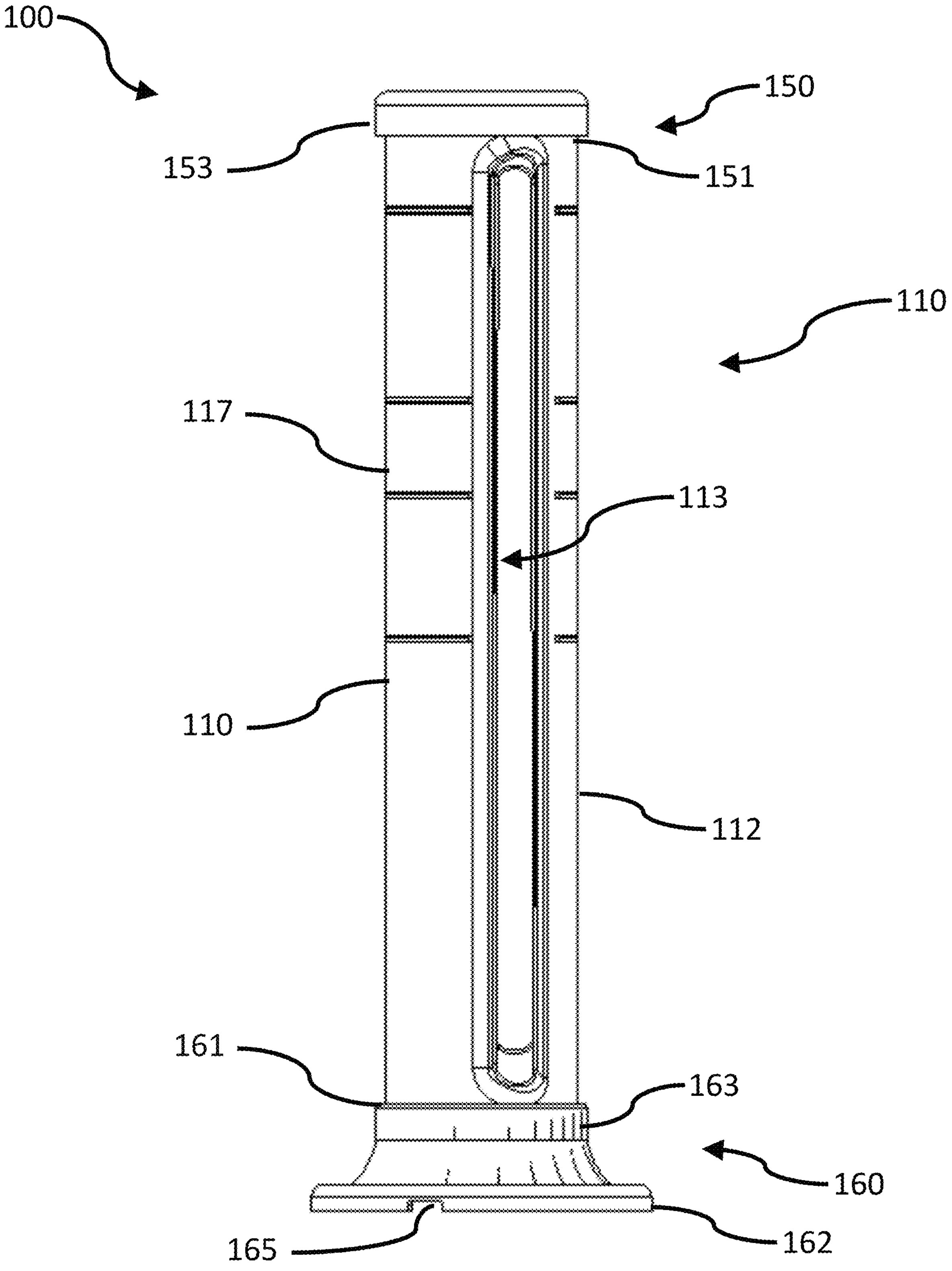
FIG. 1 illustrates a front view of an example roller cover washing and/or cleaning system.
Figure 2:
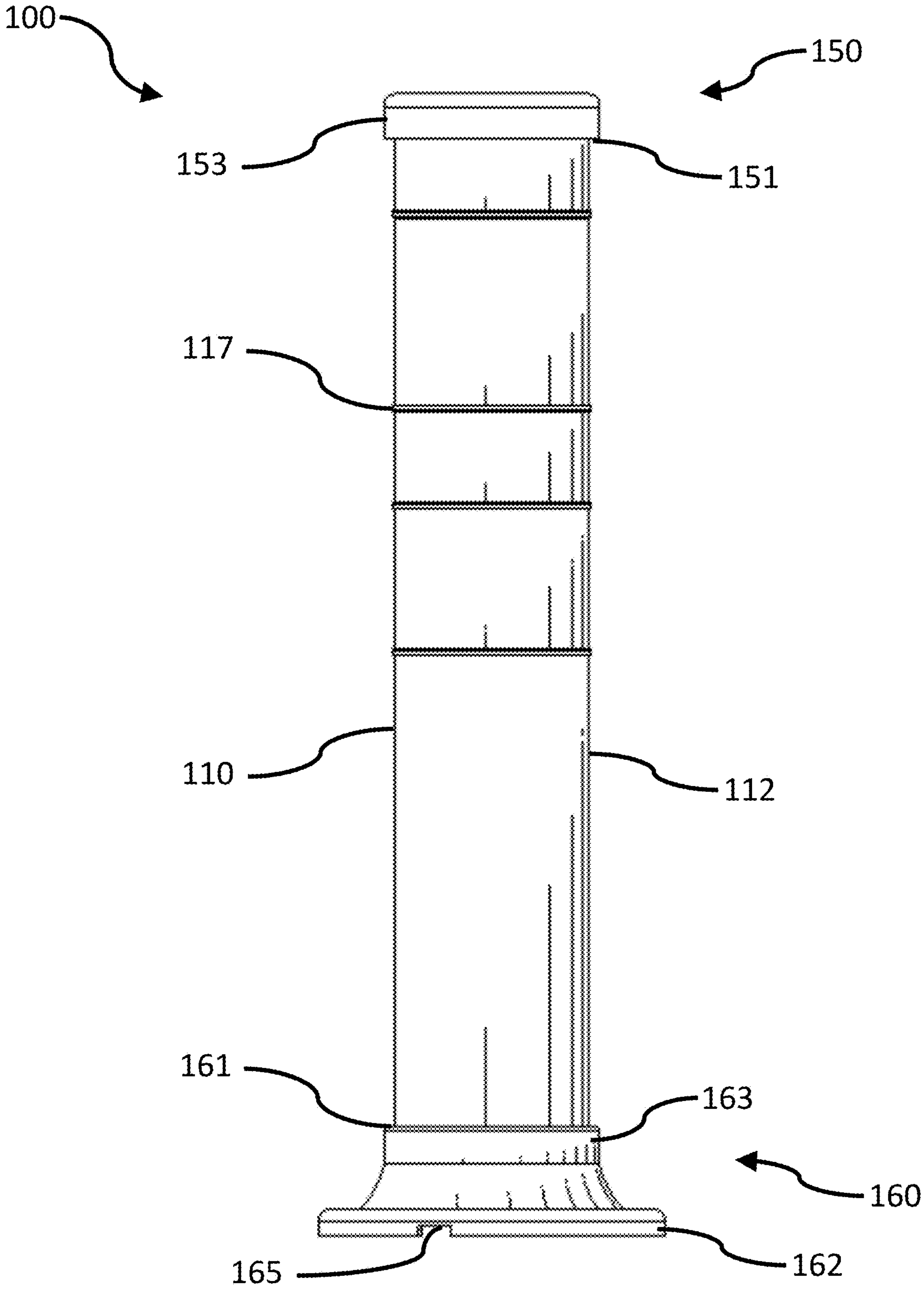
FIG. 2 illustrates a rear view of the example system of FIG. 1.
Figure 3:
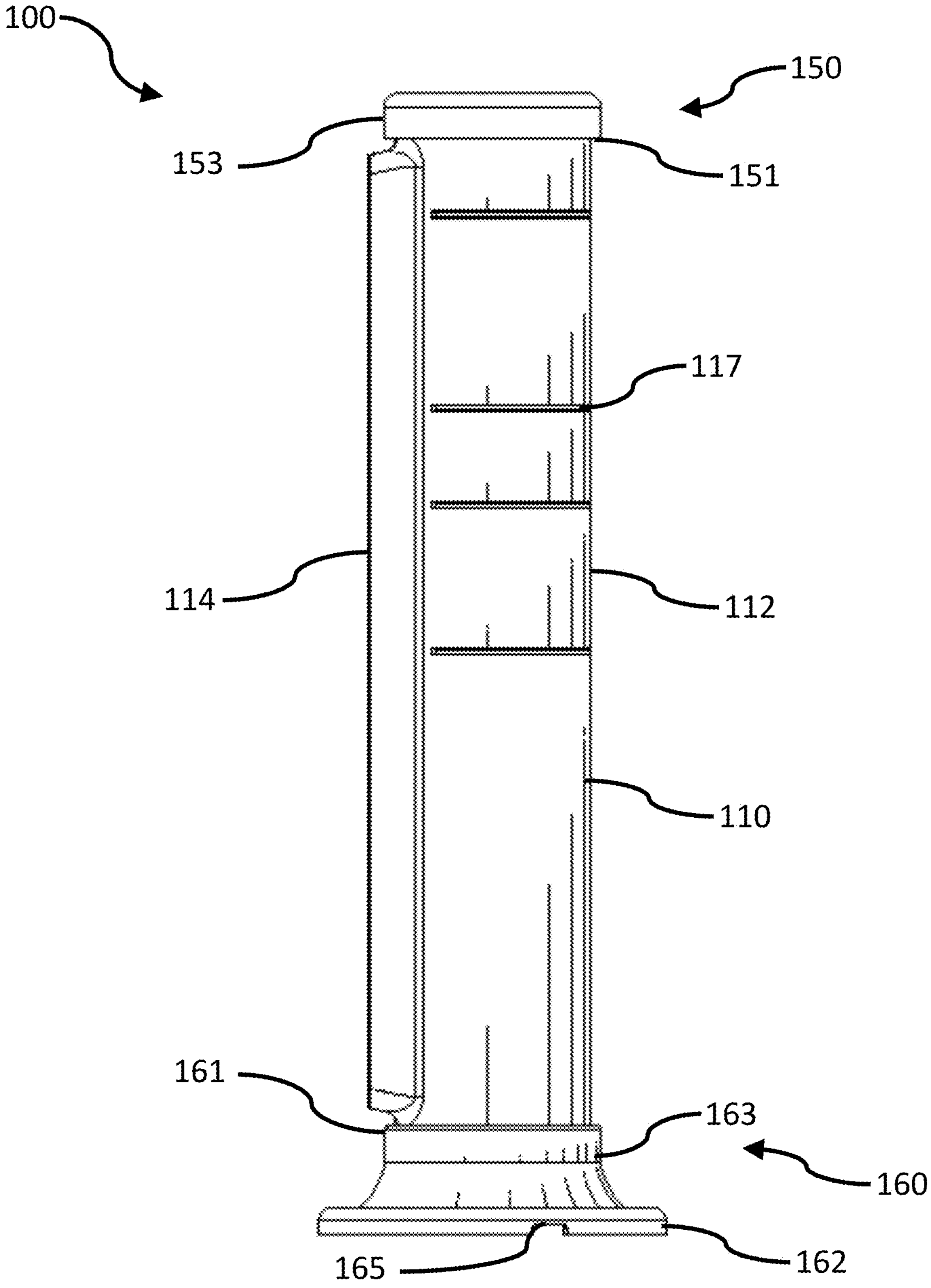
FIG. 3 illustrates a right side view of the example system of FIGS. 1 & 2.
Figure 4:
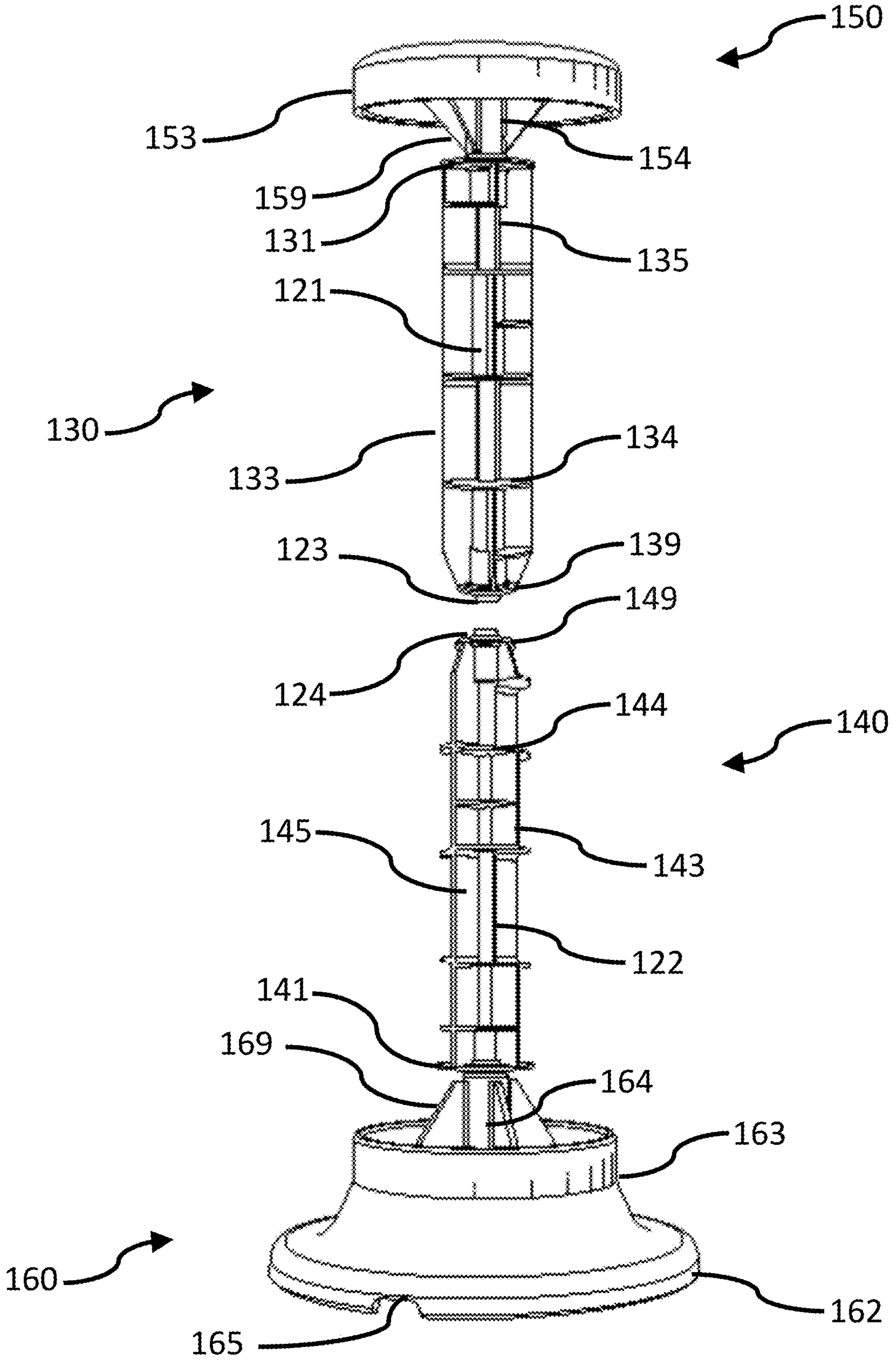
FIG. 4 illustrates a side view of the example system of FIGS. 1-3 with a tubular enclosure removed.
Figure 5:
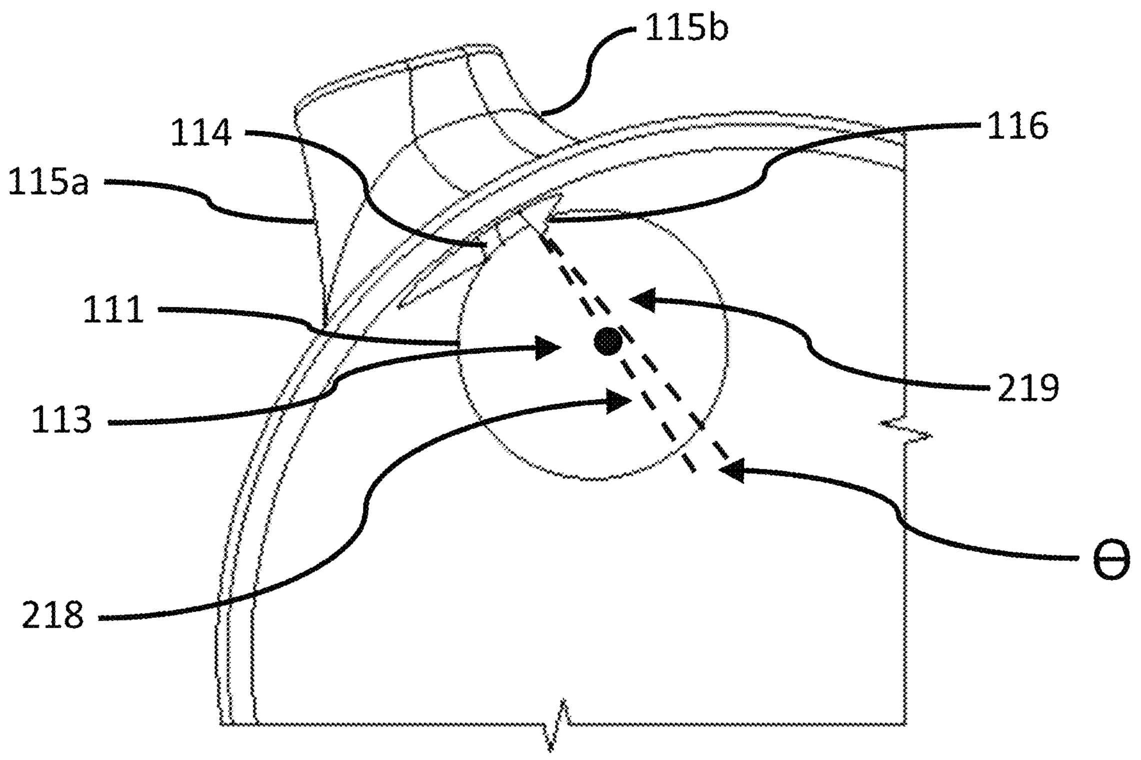
FIG. 5 illustrates a detailed view through an internal lumen of the example system of FIGS. 1-4.
Figure 6:
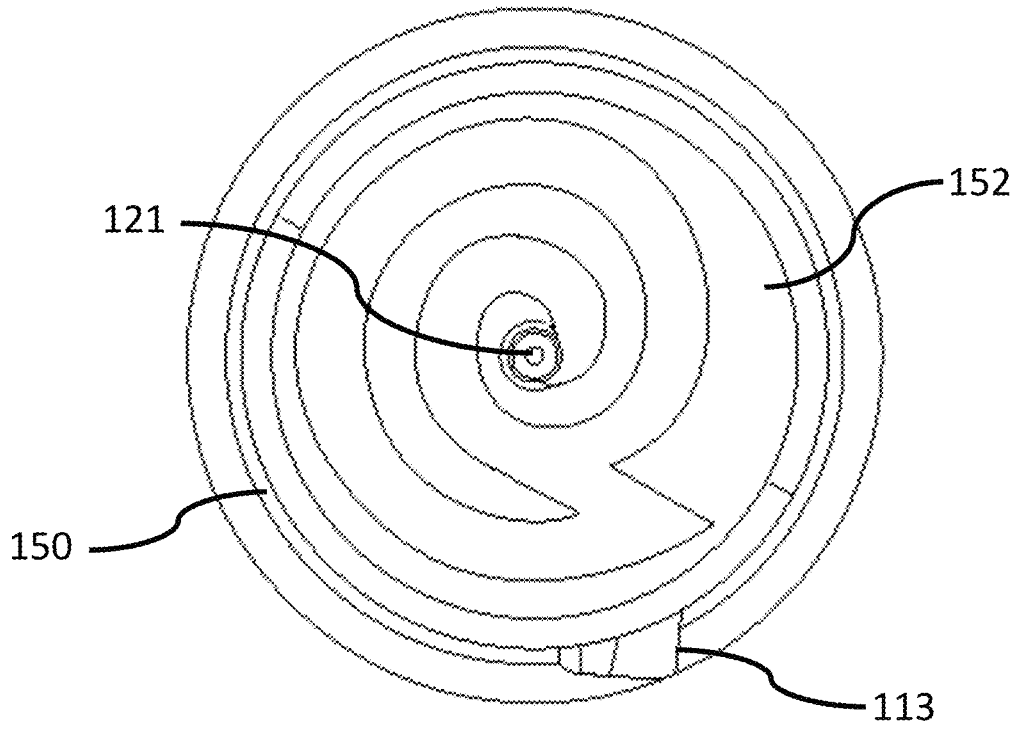
FIG. 6 illustrates a top view of the example system of FIGS. 1-4.

FIGS. 1-7 illustrate an example paint roller cover cleaning and/or washing system 100 in accordance with the disclosure. System 100 includes a tubular enclosure 110, a cap 150, a bottom or base 160, a first rotor 130 and a second rotor 140 (FIG. 4).

Tubular enclosure 110 is configured to temporarily house a paint roller cover and is defined by an exterior surface 112 surrounding an interior surface 111 (FIG. 5) to provide a sidewall surrounding a lumen 113. Lumen 113 has a center and a length extending from an open first end to an open second end.

Tubular enclosure 110 may take any of a variety of cross-sectional shapes including but not limited to circular such as in a right, circular cylinder. Tubular enclosure 110 may be provided in any of a variety of dimensions suitable for at least temporarily housing a paint roller cover during cleaning or washing. In an example, tubular enclosure 110 measures approximately 22 in. long and 4 in. in diameter.

A plurality of indices 117 may be provided on the tubular enclosure exterior surface 112 spaced apart along the length. Indices 117, which may be provided by additive techniques such as painting or decaling or by subtractive techniques such as scoring or etching, clearly communicate a variety of different roller cover sizes with which the cleaning system may be suitable for use. Indices 117 may further provide the user with guidance as to the insertion of various sizes of roller covers.

Cap 150 (FIGS. 4 & 6) is configured to surround tubular enclosure 110 with a bottom rim 151 and sidewall 153 and to close the open first end with an upper surface 152. Cap 150 may further include a central opening configured to accommodate a pin or axle. For stability of any pin or axle received through cap 150, a sleeve 154 surrounding the central opening may be provided to an underside of cap 150 and be reinforced by fins 159. When cap 150 is provided to the first open end of tubular enclosure 110, sleeve 154 and fins 159 project or extend into tubular enclosure 110 and/or a lumen 113 of the same.

Base 160 (FIG. 7) is configured to support tubular enclosure 110 while surrounding the second open end and includes one or more drain holes 167 defined between spines 166 and a bottom rim 162 configured to mate with or otherwise contact a bucket rim or support surface. In an example, base bottom rim 162 is configured to match with the upper rim of a 1-gallon bucket 500 and may have a diameter or width of about 6 in. Base 160 may further include an upper rim 161 configured to surround a portion of tubular enclosure 110 near the second end. Base 160 may transition between upper rim 161 and bottom rim 162 by a neck 163 (FIGS. 1-4).

Base 160 may further include a central opening configured to accommodate a pin or axle. For stability of any pin or axle received through base 160, a sleeve 164 (FIG. 4) surrounding the central opening may be provided to an upper surface of the base and be reinforced by fins 169. When base 160 is provided to the second open end of tubular enclosure 110, sleeve 164 and fins 160 project or extend into the tubular enclosure.

One or more notches 165 may be formed in bottom rim 162 of base 160. In an example, notches 165 are formed in diametrically opposed locations on bottom rim 162. Notches 165 may be configured to accommodate some portion of a bucket handle so that bottom rim 162 smoothly contacts the bucket upper rim.

Figure 8:
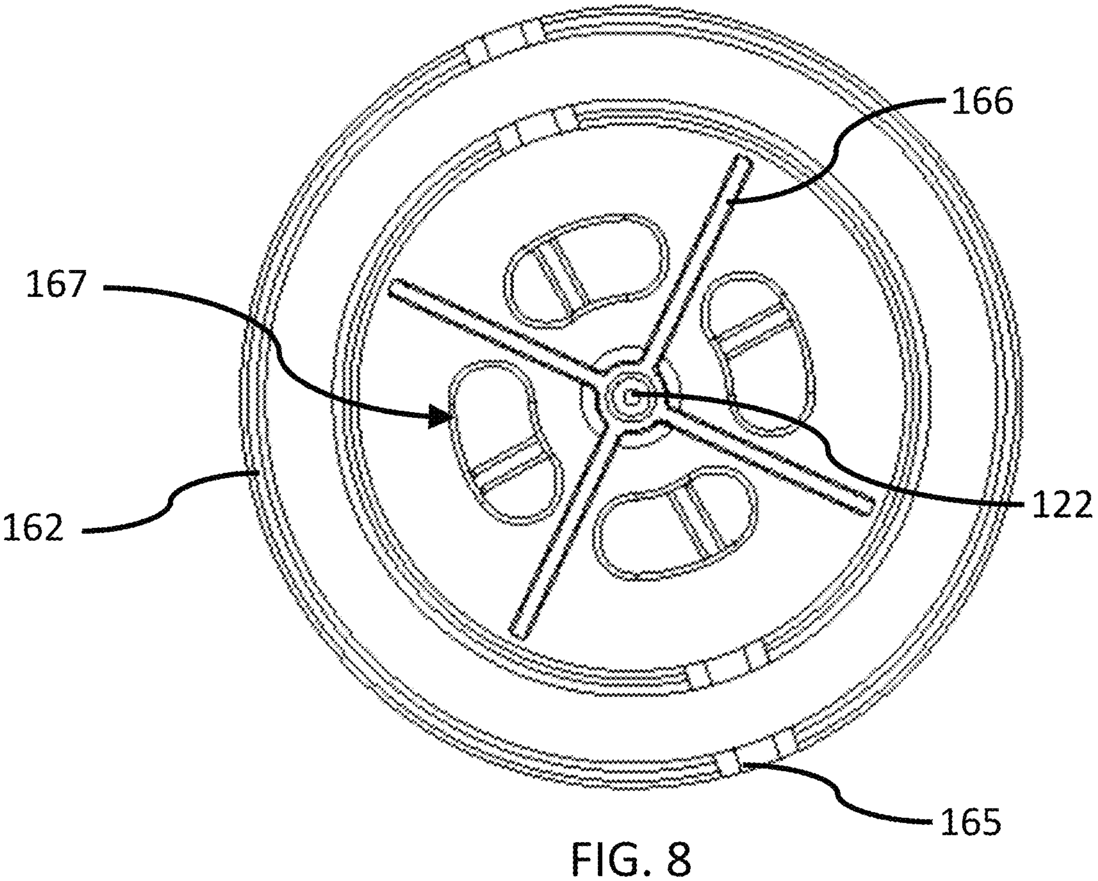
FIG. 8 illustrates a bottom view of the example system of FIGS. 1-6.

A base adapter 170 (FIG. 8) may also be provided with system 100. Base adapter 170 has a first rim 171 configured to contact a bucket rim or other support surface and a second rim 172 configured for selective coupling with bottom rim 162 of base 160. In an example, base adapter first rim 171 is configured to match with the upper rim of a 5-gallon bucket and may have a diameter or width of about 12 in.

First rotor 130 (FIG. 4) has a length extending from a first end plate 131 to a second end plate 139 and is configured for rotatable coupling with cap 150 through a first axle 121 received through the central opening of the cap and for insertion into a lumen of a paint roller cover from a first end. In an example, a fastener 123 turned into internal threads of first axle 121 at second end plate 139 rotatably couples first axle 121, first rotor 130 and cap 150.

When coupled with cap 150 while the cap is coupled with tubular enclosure 110, first rotor 130 projects from a top end of the tubular enclosure 110 inwards and is configured to support a paint roller cover at a first end thereof. The first and second end plates 131 and 139 of first rotor 130 may exhibit a circular or annular shape.

First rotor 130 further includes a diametric flange 133, a number of transverse, concentric disc segments 134 and a series of radial flanges or blades 135. Diametric flange 133 extends from a center of the rotor along the length. Transverse, concentric disc segments 134 are placed along the length. Radial flanges or blades 135 extend between pairs of concentric disc segments 134 such that adjacent blades are relatively angled about 180 degrees.

A first of the concentric disc segments 134 is defined by an arc sweeping between about 0 and about 180 degrees as with a half-disc. A second of the concentric disc segments 134 is defined by an arc sweeping between 0 and 360 degrees as with a full disc. A third of the concentric disc segments 134 is defined by an arc sweeping between about 180 and about 270 degrees as with a quarter-disc. A fourth of the concentric disc segments 134 is defined by an arc sweeping between 0 and 360 degrees. A fifth of the concentric disc segments 134 is defined by an arc sweeping between about 0 and about 90 degrees. A sixth of the concentric disc segments 134 is defined by an arc sweeping between 0 and 360 degrees. A seventh of the concentric disc segments 134 is defined by an arc sweeping between about 180 degrees and about 360 degrees. While first rotor 131 may be provided in any of a variety of dimensions, in an example the first rotor measures approximately 5 in. long.

In an example, concentric disc segments 134 have a smaller diameter than that of first end plate 131. In a further example, concentric disc segments 134 have a diameter of a size similar to the internal diameter of a roller cover whereas first end plate 131 has a diameter greater than the internal diameter of a roller cover.

Second rotor 140 has a length extending from a first end plate 141 to a second end plate 149 and is configured for rotatable coupling with base 160 through a second axle 122 received through the central opening of base 160 and for insertion into a lumen of a paint roller cover from a second end. In an example, a fastener 124 turned into internal threads of second axle 122 at second end plate 149 rotatably couples second axle 122, second rotor 140 and base 160.

Figure 9:
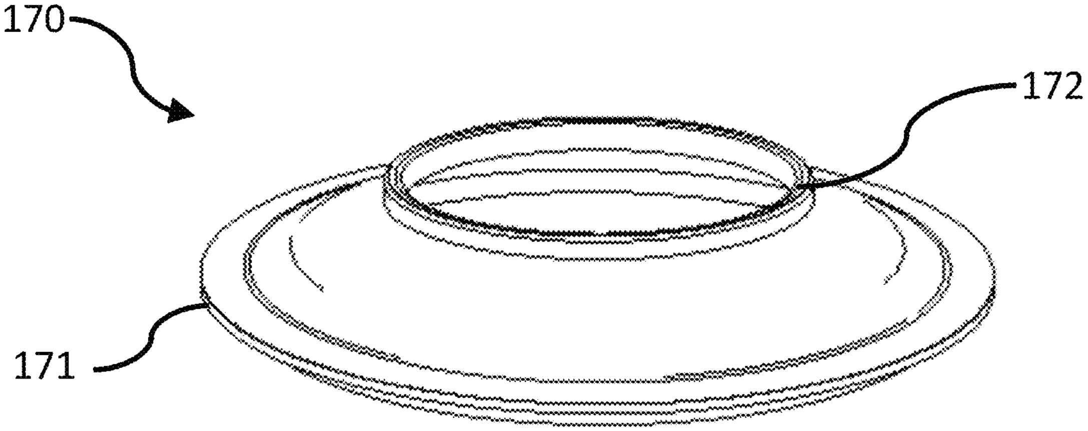
FIG. 9 illustrates an example base adapter suitable for use in association with disclosed roller cover washing and/or cleaning systems.

When coupled with base 160 while the base is coupled with tubular enclosure 110, second rotor 140 projects from a bottom end of the tubular enclosure inwards and is configured to support a paint roller cover at a second end of roller cover 300 (FIG. 9). The first and second end plates 141 and 149 of second rotor 140 may exhibit a circular or annular shape.

Second rotor 140 further includes a diametric flange 143, a number of transverse, concentric disc segments 144 and a series of radial flanges or blades 145. Diametric flange 143 extends from a center of the rotor along the length. Transverse, concentric disc segments 144 are placed along the length. Radial flanges or blades 145 extend between pairs of concentric disc segments such that adjacent blades are relatively angled about 180 degrees.

A first of the concentric disc segments 144 is defined by an arc sweeping between about 0 and about 180 degrees. A second of the concentric disc segments 144 is defined by an arc sweeping between 0 and 360 degrees. A third of the concentric disc segments 144 is defined by an arc sweeping between about 180 and about 270 degrees. A fourth of the concentric disc segments 144 is defined by an arc sweeping between 0 and 360 degrees. A fifth of the concentric disc segments 144 is defined by an arc sweeping between about 0 and about 90 degrees. A sixth of the concentric disc segments 144 is defined by an arc sweeping between 0 and 360 degrees. A seventh of the concentric disc segments 144 is defined by an arc sweeping between about 180 degrees and about 360 degrees. While the second rotor 140 may be provided in any of a variety of dimensions, in an example, the second rotor 140 measures approximately 5 in. long.

In an example, concentric disc segments 144 have a smaller diameter than that of the first end plate 141. In a further example, concentric disc segments 144 have a diameter of a size similar to the internal diameter of a roller cover whereas first end plate 141 has a diameter greater than the internal diameter of a roller cover.

With both rotors 130 and 140 mounted through their respective axles a series of radial flanges or blades 145 of second rotor 140 may be rotationally offset from blades 135 of first rotor 130. In an example, radial flanges or blades 145 of second rotor 140 may be rotationally offset from blades 135 of first rotor 130 by about 30 degrees. With such an offset of 30 degrees, a first of the concentric disc segments 144 of the second rotor is defined by an arc sweeping between about 30 and about 210 degrees as with a half-disc, a second of the concentric disc segments 144 of the second rotor is defined by an arc sweeping between about 30 and about 390 degrees as with a full disc, a third of the concentric disc segments 144 of the second rotor is defined by an arc sweeping between about 210 and about 300 degrees as with a quarter-disc, a fourth of the concentric disc segments 144 of the second rotor is defined by an arc sweeping between 30 and 390 degrees, a fifth of the concentric disc segments 144 of the second rotor is defined by an arc sweeping between about 30 and about 120 degrees, a sixth of the concentric disc segments 144 of the second rotor is defined by an arc sweeping between 30 and 390 degrees and a seventh of the concentric disc segments 144 of the second rotor is defined by an arc sweeping between about 210 degrees and about 390 degrees.

In communication with lumen 113, a slot 114 is formed through exterior 112 and interior 111 surfaces of tubular enclosure 110 and has a sidewall projecting outward from exterior surface 112 of tubular enclosure 110 as well as into lumen 113 and forms a rib 116 within the lumen. The sidewall may further include a first elongate sidewall section **115*a* having a first height above exterior surface 112 of tubular enclosure 110 and a second elongate sidewall section 115*b* having a second height above exterior surface 112 which is less than the first height. Slot 114 has a length approximately/substantially parallel with the length of tubular enclosure 110**.

Second sidewall section **115*b* projects into lumen 113 to form a rib 116 within the lumen. Rib 116 may join interior surface 111 of tubular enclosure 110 along a fillet and include a curved surface with a radius of curvature extending within a transverse slice or circular cross-section through the tubular enclosure. Sidewalls sections 115*a* and 115*b* may also include one or more inner surfaces coincident with non-diametric longitudinal planes bisecting tubular enclosure 110**.

Slot 114 and rib 116 are configured to cooperate and/or are cooperatively configured to direct a fluid stream into lumen 113 along a non-diametric path 219 (FIG. 5), which is to say, along a path not passing through the center of the tubular enclosure lumen 113. As such, path 219 may form a non-zero angle, θ, with a longitudinal plane 218 passing through the lumen center and slot 114. In an example, θ measures approximately 17 degrees.

Figure 7:
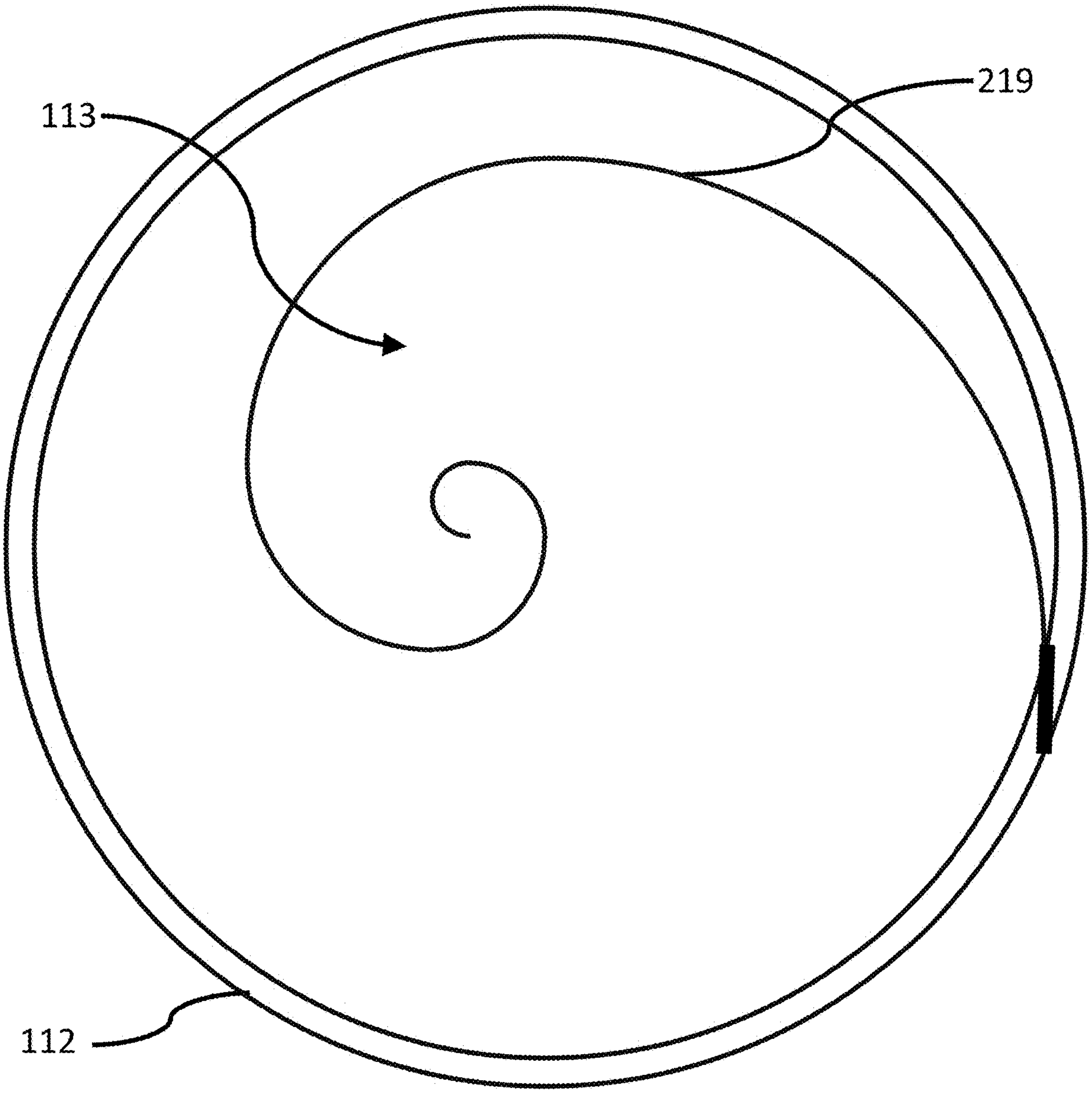
FIG. 7 illustrates a schematic view of an example fluid path which may result from use of disclosed systems.

Additionally or alternatively path 219 may be tangent to a circle having a diameter less than a width of lumen 113. In an example where lumen 113 is of circular cross-section, the diameter would be less than a diameter of the lumen. In an example, the path may be tangent to a circle having the diameter of a roller cover. In an example, path 219 is substantially coincident with a spiral segment (FIG. 7). In a further example, the spiral is a golden spiral, a Fibonacci spiral or a logarithmic spiral.

Slot 114 and rib 116 are additionally or alternatively configured to cooperate and/or are cooperatively configured to direct a fluid stream into lumen 113 so that the fluid stream spins or rotates first and second rotors 130 and 140 inserted into the tubular enclosure lumen 113 and/or any roller cover provided to the first and/or second rotor 140.

Disclosed systems may be suitable for use in a variety of methods for washing or otherwise cleaning a paint roller cover. In an example method, a tubular enclosure is provided which is defined by an exterior surface surrounding an interior surface surrounding a lumen having a center and a length extending from an open first end to an open second end.

A slot is formed through the exterior and interior surfaces of the tubular enclosure so as to communicate with the lumen of the tubular enclosure wherein the slot has a first elongate sidewall having a first height and a second elongate sidewall having a second height less than the first height and wherein the second sidewall projects into the lumen to form a rib.

A first rotor is rotatably coupled to a base through a first axle, wherein the first rotor has a length extending from a first end plate to a second end plate and the base includes a bottom rim surrounding one or more drain holes. In an example, the first axle is inserted through central openings in each of the base and the first rotor so as to align the base and first rotor and the base and first rotor are coupled together by placing first and second washers at respective first and second ends of the first axle threading a fastener into internal threads of the first axle at the first and second ends to secure the washers. The base is coupled to the tubular enclosure so as to surround the second open end and such that the first rotor projects into the lumen of the tubular enclosure. The bottom rim of the base is rested on a support surface so as to support the tubular enclosure thereabove.

A paint roller cover is placed over/around the first rotor until the paint roller cover contacts a first end plate of the rotor.

Figure 10:
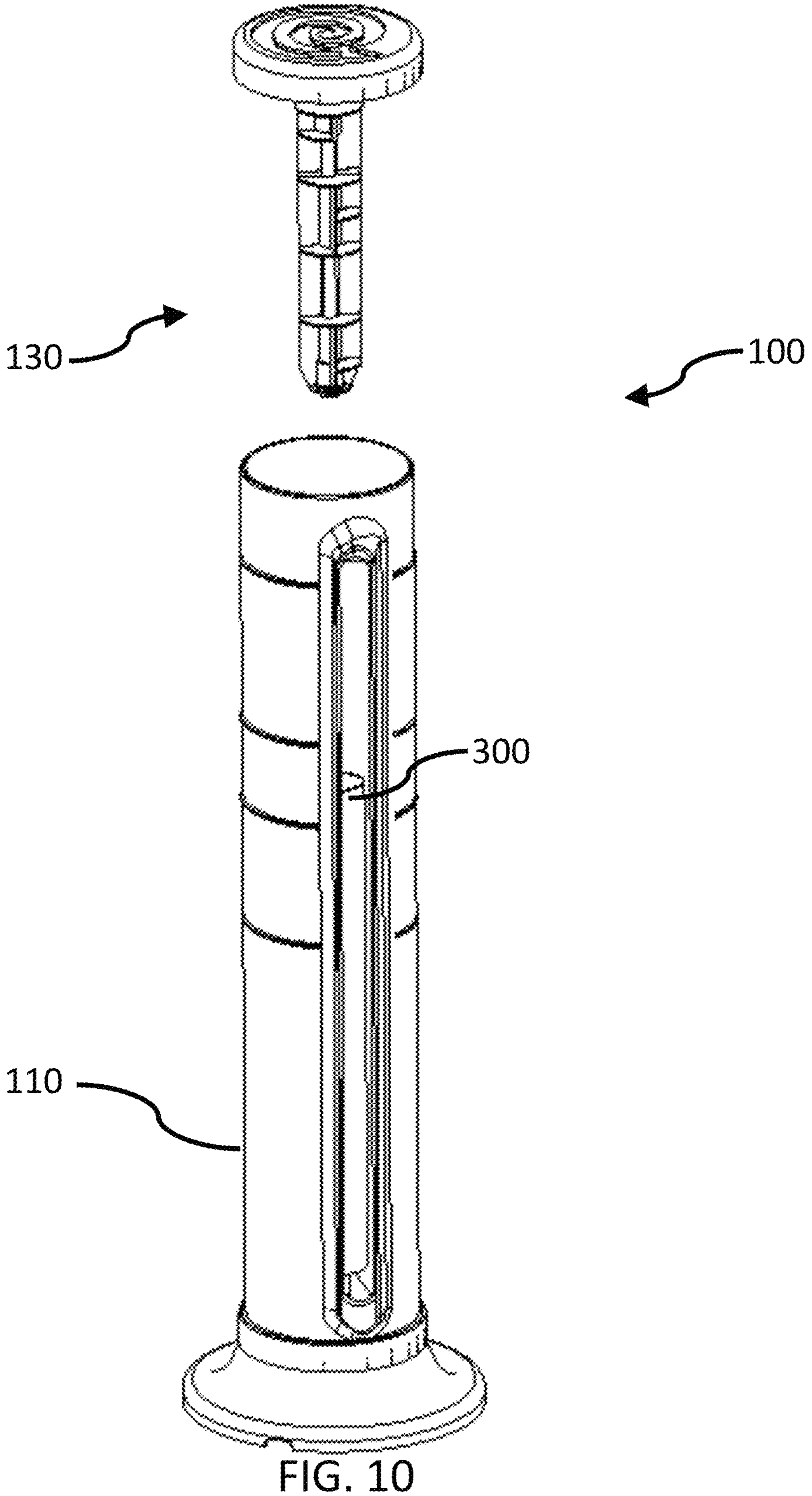
FIG. 10 illustrates enclosing an example roller cover in an example roller cover washing and/or cleaning system.
Figure 11:
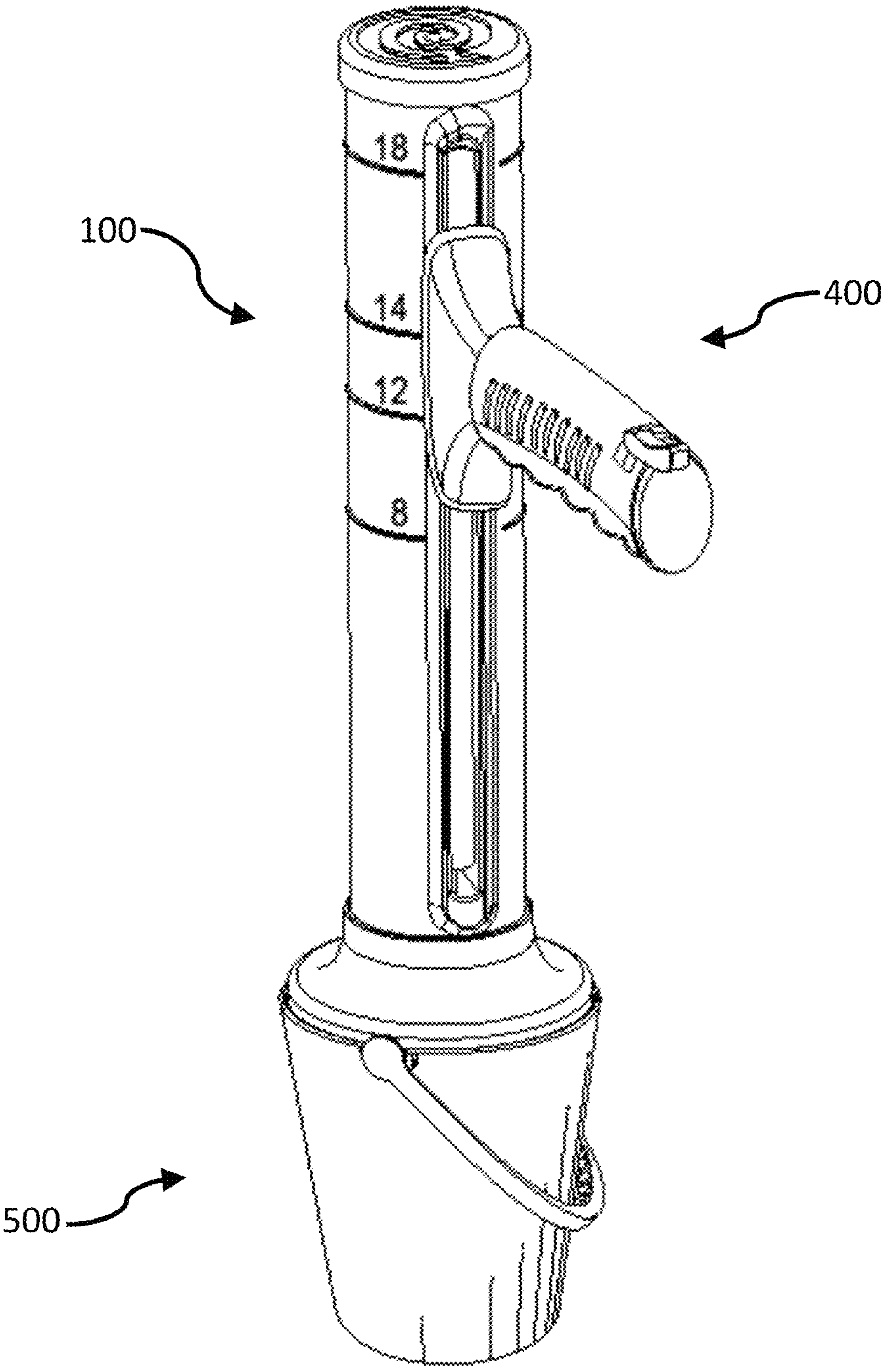
FIG. 11 illustrates an example use of disclosed roller cover washing and/or cleaning systems with an example spray nozzle 400 and example bucket 500.

A second rotor is rotatably coupled to a cap through a second axle, wherein the second rotor has a length extending from a first end plate to a second end plate and the cap includes a bottom rim and an upper surface. In an example, the second axle is inserted through central openings in each of the cap and the second rotor so as to align the cap and second rotor. The cap and second rotor are coupled together by placing first and second washers at respective first and second ends of the second axle threading a fastener into internal threads of the second axle at the first and second ends to secure the washers. The second rotor is inserted into the lumen of the paint roller cover and the cap is coupled to the tubular enclosure so as to surround and close the open first end (FIG. 10).

With the slot and rib, a fluid stream such as a stream of water or cleanser is directed into the tubular enclosure along a non-diametric path and into contact with the roller cover to rinse and/or clean the same. The roller cover spins in response to the force applied by the fluid stream shedding water from the roller cover to the interior surface of the tubular enclosure and through the drain holes in the base/bottom cover (FIG. 10).

Embodiments of the disclosure are susceptible to being used for various purposes, including, though not limited to, enabling users to conveniently wash or otherwise clean painting applicators such as roller covers.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. A paint roller cover cleaning system, comprising:

configured to house a paint roller cover, a tubular enclosure defined by an exterior surface surrounding an interior surface surrounding a lumen having a center and a length extending from an open first end to an open second end; and in communication with the lumen, a slot formed through the exterior and interior surfaces of the tubular enclosure and having a sidewall projecting outward from the exterior surface of the tubular enclosure as well as into the lumen and forming a rib within the lumen;

configured to surround and close the open first end of the tubular enclosure, a cap;

configured for rotatable coupling with the cap through a first axle and for insertion into a lumen of a paint roller cover from a first end, a first rotor having a length extending from a first end plate to a second end plate;

configured to support the tubular enclosure while surrounding the second open end, a base including one or more drain holes and a bottom rim; and configured for rotatable coupling with the base through a second axle and insertion into a lumen of a paint roller cover from a second end, a second rotor having a length extending from a first end plate to a second end plate; and wherein the slot and the rib are configured to cooperate to direct a fluid stream into the lumen along a path forming a non-zero angle with a longitudinal plane passing through the slot and the lumen center.

2. The system as set forth in claim 1, wherein the non-zero angle measures 17 degrees.

3. The system as set forth in claim 1, wherein the first end plates of the first and second rotors exhibit circular shapes; and the first and second rotors each further include:

a diametric flange extending from a center of the rotor along the length;

a series of transverse, concentric disc segments placed along the length; and a series of radial blades extending between pairs of concentric disc segments such that adjacent radial blades are angled 180 degrees relative to one another.

4. A paint roller cover cleaning system, comprising:

configured to house a paint roller cover, a tubular enclosure defined by an exterior surface surrounding an interior surface surrounding a lumen having a center and a length extending from an open first end to an open second end;

in communication with the lumen, a slot formed through the exterior and interior surfaces of the tubular enclosure and having a sidewall projecting outward from the exterior surface of the tubular enclosure as well as into the lumen and forming a rib within the lumen;

configured to surround and close the open first end of the tubular enclosure, a cap;

configured for rotatable coupling with the cap through a first axle and for insertion into a lumen of a paint roller cover from a first end, a first rotor having a length extending from a first end plate to a second end plate;

configured to support the tubular enclosure while surrounding the second open end, a base including one or more drain holes and a bottom rim; and configured for rotatable coupling with the base through a second axle and for insertion into a lumen of a paint roller cover from a second end, a second rotor having a length extending from a first end plate to a second end plate; and wherein the slot and the rib are configured to cooperate to direct a fluid stream into the lumen along a path tangent to a circle having a diameter less than a width of the lumen.

5. The system as set forth in claim 4, wherein the path is substantially coincident with a spiral segment.

6. The system as set forth in claim 4, wherein the first rotor further comprises:

a diametric flange extending from a center of the rotor along the length;

a series of transverse, concentric disc segments placed along the length; and a series of radial blades extending between pairs of concentric disc segments such that adjacent radial blades are angled 180 degrees relative to one another.

7. The system as set forth in claim 4, wherein the second rotor further comprises:

a diametric flange extending from a center of the rotor along the length;

a series of transverse, concentric disc segments placed along the length; and a series of radial blades extending between pairs of concentric disc segments such that adjacent radial blades are angled 180 degrees relative to one another.

8. The system as set forth in claim 4, further comprising a base adapter having a first rim configured for selective coupling with the bottom rim of the base and a second rim configured to contact a support surface.

9. The system as set forth in claim 4, further comprising a plurality of indices on the tubular enclosure exterior surface spaced apart along the length.

10. A paint roller cover cleaning system, comprising:

configured to house a paint roller cover, a tubular enclosure defined by an exterior surface surrounding an interior surface surrounding a lumen having a center and a length extending from an open first end to an open second end;

in communication with the lumen, a slot formed through the exterior and interior surfaces of the tubular enclosure and having a first elongate sidewall having a first height and a second elongate sidewall having a second height less than the first height wherein the second sidewall projects into the lumen to form a rib within the lumen;

a cap surrounding and closing the open first end of the tubular enclosure;

configured for insertion into a lumen of a paint roller cover from a first end, a first rotor rotatably coupled with the cap through a first axle and having a length extending from a first end plate to a second end plate;

configured to support the tubular enclosure, a base surrounding the second open end and including one or more drain holes and a bottom rim; and rotatably coupled with the base through a second axle, a second rotor configured for insertion into a lumen of a paint roller cover from a second end and having a length extending from a first end plate to a second end plate; and wherein the slot and the rib are configured to cooperate to direct a fluid stream into the lumen so that the fluid stream rotates a roller cover provided to the tubular enclosure lumen.

11. The system as set forth in claim 10, further comprising a base adapter having a first rim configured to contact a support surface and a second rim coupled with the bottom rim of the base.

12. The system as set forth in claim 10, further comprising a plurality of indices on the tubular enclosure exterior surface spaced apart along the length.

* * * * *